(12) United States Patent
Hasegawa et al.

(10) Patent No.: US 7,302,969 B2
(45) Date of Patent: Dec. 4, 2007

(54) VALVE DEVICE FOR USE WITH FUEL CELLS

(75) Inventors: Tatsuji Hasegawa, Kakuda (JP); Masakazu Murai, Portage, MI (US); Junichi Sugamori, Miyagi-ken (JP); Yoshio Kusano, Utsunomiya (JP); Toshikatsu Katagiri, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/291,410

(22) Filed: Nov. 30, 2005

(65) Prior Publication Data

US 2006/0144450 A1 Jul. 6, 2006

(30) Foreign Application Priority Data

Nov. 30, 2004 (JP) ............................. 2004-347901

(51) Int. Cl.
F16K 11/052 (2006.01)
(52) U.S. Cl. .............................. 137/625.46; 137/637.3; 251/288
(58) Field of Classification Search ........... 137/625.46, 137/637.3, 877; 251/285, 288
See application file for complete search history.

(56) References Cited

U.S. PATENT DOCUMENTS

| 1,988,945 A | * | 1/1935 | Hansen .................. 137/607 |
| 5,139,230 A | * | 8/1992 | Lester ..................... 251/285 |
| 5,325,888 A | * | 7/1994 | Stary ..................... 137/553 |
| 5,348,271 A | * | 9/1994 | Owen et al. ............. 251/95 |
| 5,427,141 A | * | 6/1995 | Ohtsubo ................. 137/595 |
| 6,371,439 B1 | * | 4/2002 | Trevisan ................. 251/58 |
| 2004/0224200 A1 | | 11/2004 | Ichikawa et al. |

FOREIGN PATENT DOCUMENTS

| JP | 2001-250716 | 9/2001 |
| JP | 2004-183710 | 7/2004 |
| JP | 2004-185880 | 7/2004 |

* cited by examiner

*Primary Examiner*—John Fox
(74) *Attorney, Agent, or Firm*—Lahive & Cockfield, LLP; Anthony A. Laurentano, Esq.

(57) ABSTRACT

A first valve body is disposed in a first opening defined in a valve housing, and a second valve body is disposed in a second opening defined in the valve housing. The first valve body is fastened to a first shaft by screws, and the second valve body is fastened to the first shaft by screws. The first valve body and the second valve body are coupled to the first shaft substantially perpendicularly to each other.

14 Claims, 6 Drawing Sheets

VALVE DEVICE FOR USE WITH FUEL CELLS

BACKGROUND OF THE INVENTION

1. Field of the Invention

The present invention relates to a valve device for use in a reaction gas passage of a fuel cell system, and more particularly to a valve device for bypassing a humidifier disposed in a reaction gas passage of a fuel cell system to supply a reaction gas from a heat radiator to the cathodes of fuel cells.

2. Description of the Related Art

Solid polymer membrane fuel cell devices have a stack of cells each comprising a solid polymer electrolyte membrane sandwiched between an anode and a cathode that are disposed one on each side of the solid polymer electrolyte membrane. For operating such a stack of cells, hydrogen is supplied as a fuel to the anode and air is supplied as an oxidizing agent to the cathode. Hydrogen ions are generated at the anode by a catalytic reaction, and move through the solid polymer electrolyte membrane to the cathode where the hydrogen ions and oxygen in the air cause an electrochemical reaction to generate electric power.

If the temperature of the air is low or the fuel cell system has not reached a necessary temperature and the air does not reach a sufficient temperature even when the air is compressed by a heat radiator, then the air needs to bypass a humidifier and to be directly supplied to the cathode. Specifically, a bypass passage is provided parallel to the humidifier, and the air compressed by the heat radiator is either supplied to the humidifier or supplied through the bypass passage to the cathode depending on the temperature of the air. The flow of the air is switched between the humidifier and the bypass passage by a valve with a rotary solenoid incorporated therein (see Japanese Laid-Open Patent Publication No. 2001-250716).

The rotary solenoid disclosed in Japanese laid-open patent publication No. 2001-250716 has a bobbin with a coil wound therearound and a rotor comprising a permanent magnet oriented substantially perpendicularly to the axis of the bobbin. When an electric current flows through the coil, the rotary solenoid is energized to turn the rotor and a shaft which is coupled substantially centrally to the rotor together.

The valve with the rotary solenoid incorporated therein is disposed in the bypass passage. When the rotor is turned, the bypass passage is switched into and out of communication, thereby switching the flow of the air between humidifier and the bypass passage.

In a fuel cell system having the valve including the rotary solenoid disclosed in Japanese Laid-Open Patent Publication No. 2001-250716, the valve is disposed in the bypass passage, and no valve is disposed in a main passage which interconnects the heat radiator and the humidifier. If the temperature of the air is low or the fuel cell system has not reached a necessary temperature and the air does not reach a sufficient temperature even when the air is compressed by a heat radiator, then when the compressed air is supplied from the heat radiator through the bypass passage to the cathode, a portion of the compressed air is also supplied through the main passage to the humidifier, which supplies humidified air to the cathode. Consequently, the fuel cell system is unable to achieve an optimum temperature which matches the characteristics of the solid polymer electrolyte membrane, and has its electric generation efficiency lowered.

SUMMARY OF THE INVENTION

It is an object of the present invention to provide a valve device for fuel cells which is capable of reliably switching between reaction gas passages of a fuel cell system.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
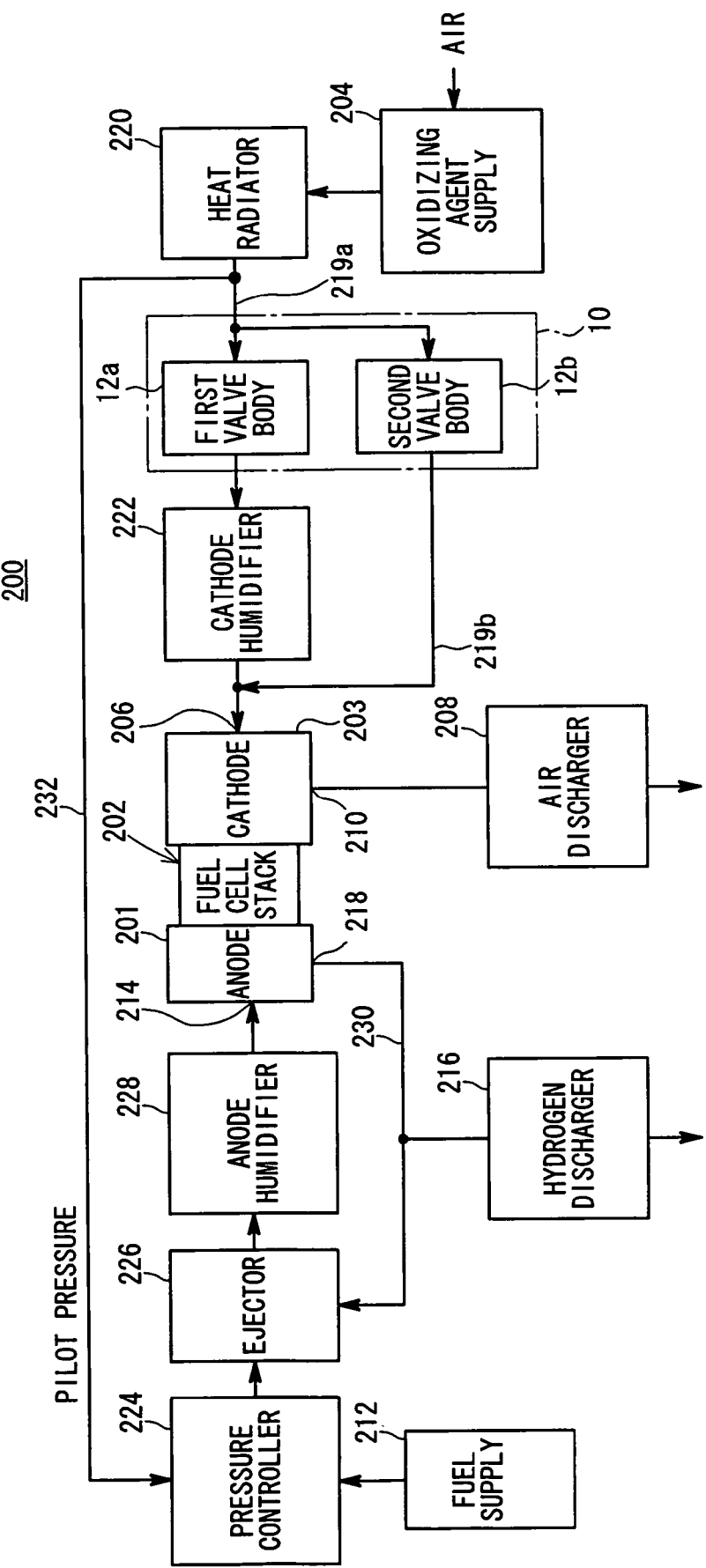
FIG. 1 is a block diagram of a fuel cell system which incorporates a valve device for fuel cells according to an embodiment of the present invention.

FIG. 1 is a block diagram of a fuel cell system 200 which incorporates a valve device 10 for use with fuel cells according to an embodiment of the present invention. The fuel cell system 200 is mounted on a vehicle such as an automobile or the like.

As shown in FIG. 1, the fuel cell system 200 includes a fuel cell stack 202 having a stack of cells each comprising a solid polymer electrolyte membrane, such as a polymer ion exchange membrane or the like, sandwiched between an anode 201 and a cathode 203 that are disposed one on each side of the polymer electrolyte membrane. The anode 201 of each cell is supplied with hydrogen as a fuel and the cathode 203 is supplied with air containing oxygen. A reaction gas used in the embodiment collectively refers to hydrogen, oxygen, air containing oxygen, and excessive gas containing them.

The cathode 203 has an air supply port 206 for being supplied with air from an oxidizing agent supply 204 and an air discharge port 210 connected to an air discharger 208 for discharging air in the cathode 203 to the outside. The anode 201 has a hydrogen supply port 214 for being supplied with hydrogen from a fuel supply 212 and a hydrogen discharge port 218 connected to a hydrogen discharger 216.

In the fuel cell stack 202, hydrogen ions that are generated at the anode 201 by a catalytic reaction move through the solid polymer electrolyte membrane to the cathode 203 where the hydrogen ions and oxygen cause an electrochemical reaction to generate electric power.

The fuel cell system 200 has a main passage 219a and a bypass passage 219b which are connected to the air supply port 206. To the main passage 219a, there are connected the oxidizing agent supply 204, a heat radiator 220, a first valve body 12a of the valve device 10, and a cathode humidifier 222 which are connected through an air supply passage in this order from an upstream region of the air supply passage. The bypass passage 219b is connected in bypassing relation to the first valve body 12*a* and the cathode humidifier 222, and serves to supply air from the heat radiator 220 through a second valve body 12*b* to the cathode 203.

The first valve body 12*a* is provided to switch the flow of air through the main passage 219*a*, and the second valve body 12*b* is provided to switch the flow of air through the bypass passage 219*b*. Specifically, for supplying air through the main passage 219*a* to the cathode 203, the first valve body 12*a* is opened, and the second valve body 12*b* is closed. For supplying air through the bypass passage 219*b* to the cathode 203, the first valve body 12*a* is closed, and the second valve body 12*b* is opened.

To the hydrogen supply port 214, there are connected the fuel supply 212, a pressure controller 224, an ejector 226, and an anode humidifier 228 which are connected through a hydrogen supply passage in this order from an upstream region of the hydrogen supply passage. The hydrogen discharger 216 is connected to the hydrogen discharge port 218 by a circulation passage 230.

The oxidizing agent supply 204 comprises, for example, a supercharger (compressor) and a motor for actuating the supercharger (not shown). The oxidizing agent supply 204 adiabatically compresses air, which contains oxygen to be used as an oxidizing gas in the fuel cell stack 202, and delivers the compressed air to the fuel cell stack 202. When the air is adiabatically compressed, it is heated. The heated air is effective to warm the fuel cell stack 202.

The air supplied from the oxidizing agent supply 204 is introduced into the fuel cell stack 202 under a preset pressure depending on a load on the fuel cell stack 202, a degree of an accelerator pedal (not shown) pressed, or the like. After the air supplied from the oxidizing agent supply 204 is cooled by the heat radiator 220, a portion of the air is supplied as a pilot pressure through a bypass passage 232 to the pressure controller 224.

The heat radiator 220 comprises an intercooler or the like (not shown), for example. The air supplied from the oxidizing agent supply 204 is cooled by a heat exchange with cooling water which flows through a flow passage in the heat radiator 220. Therefore, the air supplied to the heat radiator 220 is cooled to a predetermined temperature and then introduced from the heat radiator 220 into the cathode humidifier 222 through the valve device 10.

The cathode humidifier 222 has a water-permeable membrane (not shown), for example. The cathode humidifier 222 humidifies the air, which has been cooled to the predetermined temperature by the heat radiator 220, to a certain humidity by passing water from one side of the water-permeable membrane to the other, and supplies the humidified air to the air supply port 206 of the fuel cell stack 202. The humidified air is supplied to the fuel cell stack 202 to supply water to the solid polymer electrolyte membranes of the fuel cell stack 202, thereby keeping the ion conductivity of the solid polymer electrolyte membranes in a certain humidified state.

The fuel supply 212 comprises a hydrogen gas container (not shown) for supplying hydrogen as a fuel to the fuel cells, for example. The fuel supply 212 stores hydrogen that is to be supplied to the anode 201 of the fuel cell stack 202.

The pressure controller 224 comprises a pneumatic proportional pressure control valve, for example. Using the pressure of air from the bypass passage 232 as a pilot pressure (pilot signal pressure), the pressure controller 224 sets a secondary pressure as its outlet pressure to a pressure in a predetermined range corresponding to the pilot pressure.

The ejector 226 comprises a nozzle and a diffuser (not shown). The fuel (hydrogen) supplied from the pressure controller 224 is accelerated when it passes through the nozzle, and ejected toward the diffuser. When the hydrogen is ejected at a high speed from the nozzle to the diffuser, a negative pressure is developed in an auxiliary chamber disposed between the nozzle and the diffuser, attracting an excessive amount of fuel discharged from the anode 201 through the circulation passage 230. The fuel and the discharged hydrogen that are mixed together by the ejector 226 are supplied to the anode humidifier 228.

Therefore, the unreacted hydrogen discharged from the hydrogen discharge port 218 of the fuel cell stack 202 is introduced through the circulation passage 230 into the ejector 226. The hydrogen supplied from the pressure controller 224 and the hydrogen discharged from the fuel cell stack 202 are mixed with each other by the ejector 226 and supplied again to the fuel cell stack 202.

The anode humidifier 228 also has a water-permeable membrane, for example. The anode humidifier 228 humidifies the fuel, which has been delivered from the ejector 226, to a certain humidity by passing water from one side of the water-permeable membrane to the other, and supplies the humidified fuel to the hydrogen supply port 214 of the fuel cell stack 202. The humidified hydrogen is supplied to the fuel cell stack 202 to humidify the solid polymer electrolyte membranes of the fuel cell stack 202 to keep the ion conductivity thereof at a certain level.

The hydrogen discharge port 218 has a discharge control valve, not shown, that is connected to the hydrogen discharge port 218. The discharge control valve can be opened and closed depending on an operating state of the fuel cell stack 202.

The valve device 10 incorporated in the fuel cell system 200 will be described below.

Figure 2:
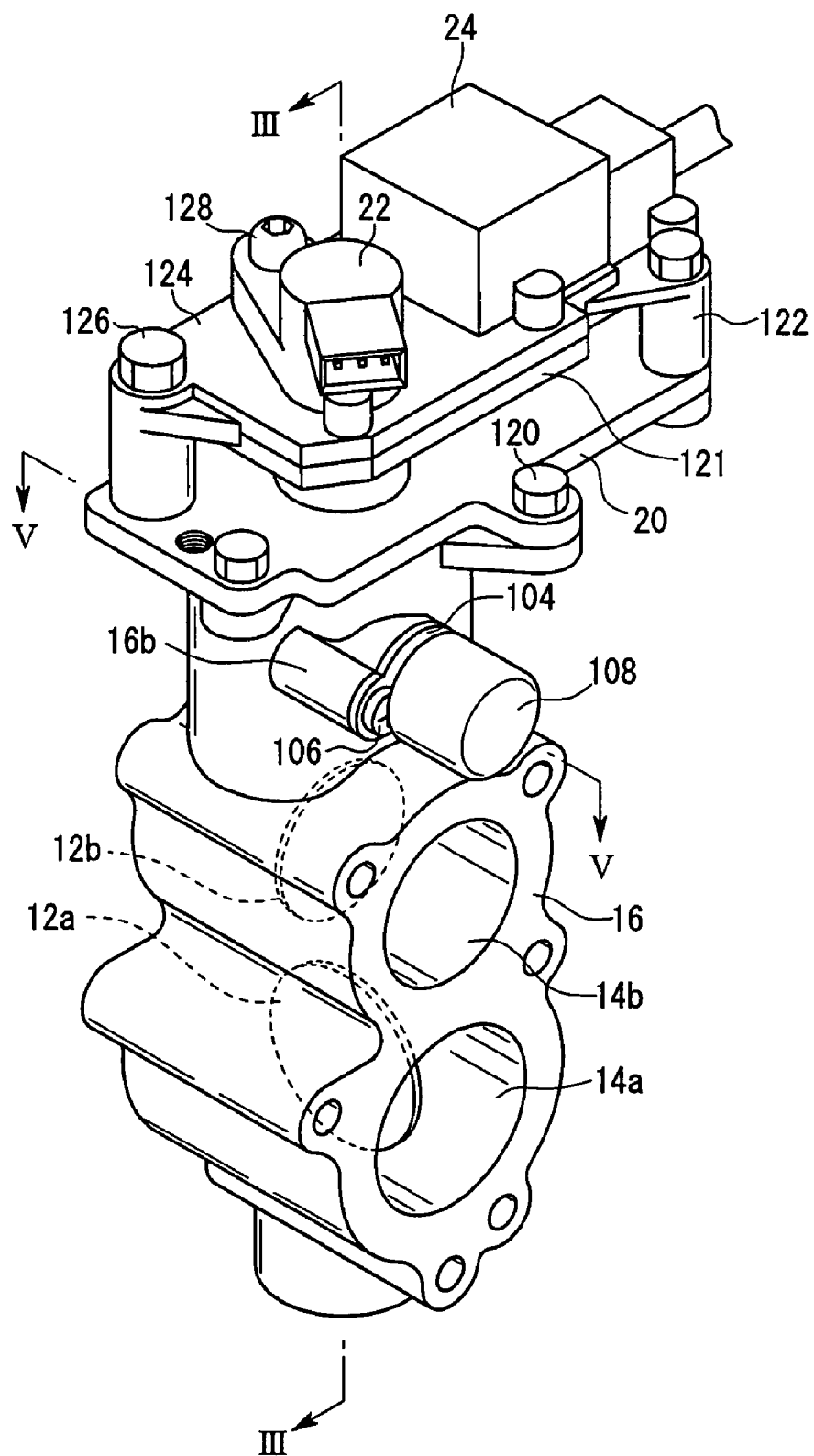
FIG. 2 is a perspective view of the valve device incorporated in the fuel cell system shown in FIG. 1.
Figure 3:
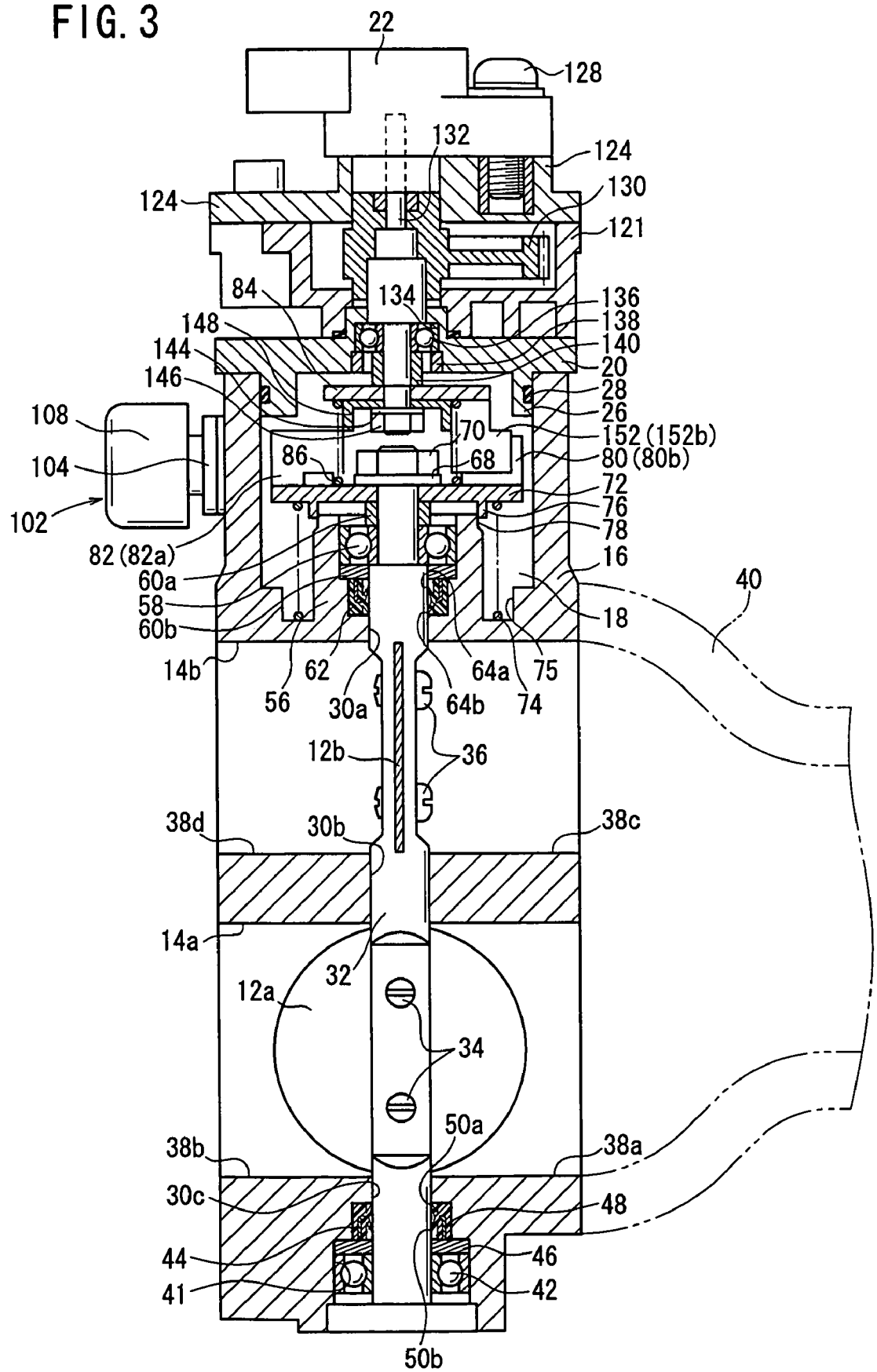
FIG. 3 is a cross-sectional view taken along line III-III of FIG. 2.

As shown in FIGS. 2 and 3, the valve device 10 includes a valve housing 16 having a first opening 14*a* defined therein for passing air through the main passage 219*a* (see FIG. 1) and a second opening 14*b* defined therein for passing air through the bypass passage 219*b*, an opening sensor 22 mounted on a closure member 20 which closes a cavity defined in the valve housing 16, and a stepping motor 24 mounted on the closure member 20 for opening and closing the first valve body 12*a* and the second valve body 12*b*.

The valve housing 16 has a chamber 18 defined as the cavity therein. The closure member 20 has an annular ridge 26 fitted in the chamber 18 and having an annular groove defined in its outer circumferential surface. The annular groove houses therein an annular seal 28 held against the inner circumferential wall surface of the valve housing 16 which defines the chamber 18. When the chamber 18 is closed by the closure member 20, the annular seal 28 hermetically seals the chamber 18 to prevent dust particles and other foreign matter from entering from outside of the valve housing 16 through the chamber 18 into the first opening 14*a* and the second opening 14*b*.

As shown in FIG. 3, the valve housing 16 has a guide hole (first guide hole) 30*a* defined therein substantially perpendicularly to the first opening 14*a* and the second opening 14*b* and providing fluid communication between the chamber 18 and the second opening 14*b*, a guide hole (second guide hole) 30*b* defined therein and providing fluid communication between the first opening 14*a* and the second opening 14*b*, a guide hole (third guide hole) 30*c* defined therein and providing fluid communication between the first opening 14*a* and an end of the valve housing 16. A first shaft 32 that can be turned about its own axis is disposed in the valve housing 16 and extends through the guide hole 30a, the second opening 14b, the guide hole 30b, the first opening 14a, and the guide hole 30c.

Figure 4:
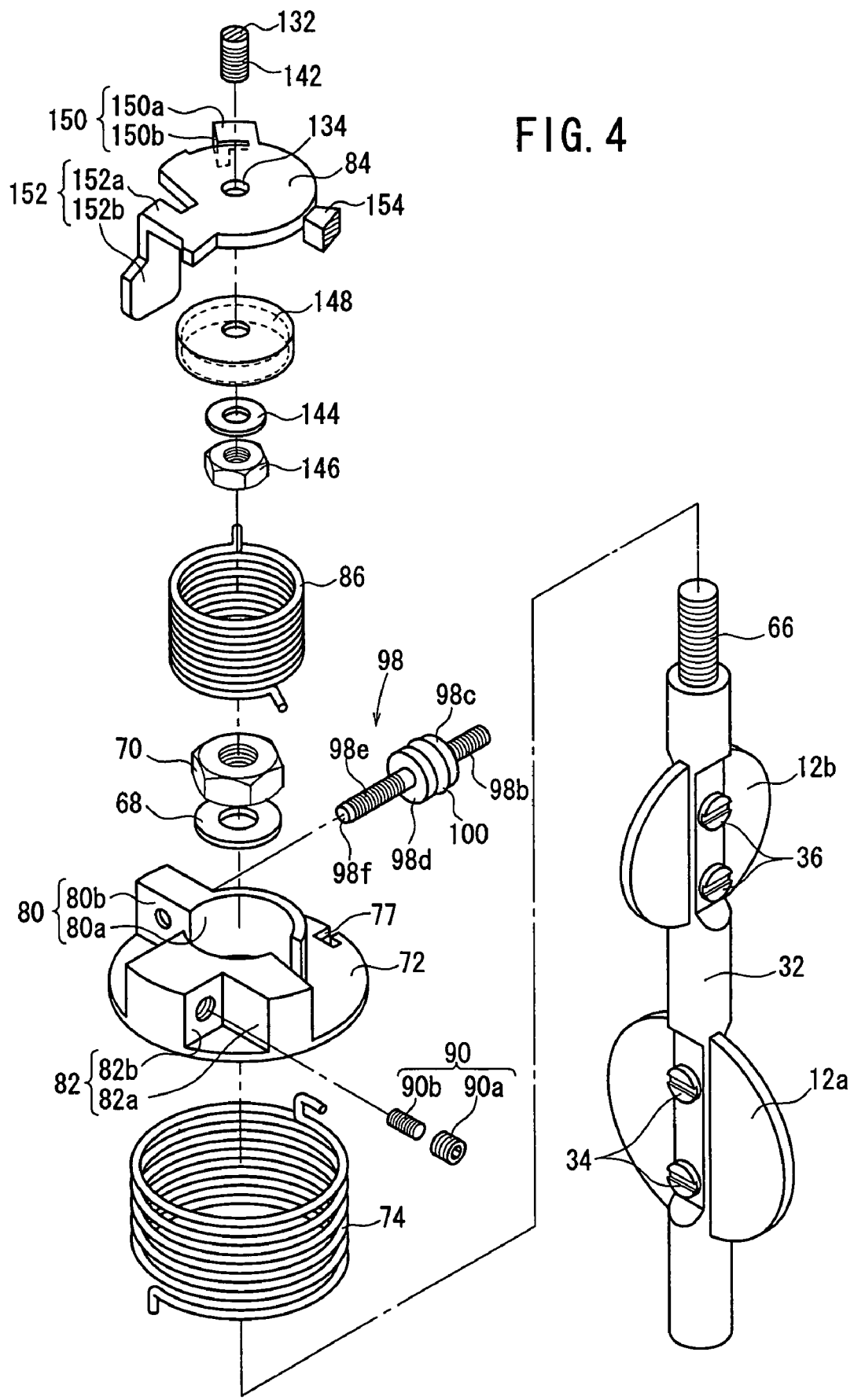
FIG. 4 is an exploded perspective view of an actuating assembly of the valve shown in FIG. 2.

The first valve body 12a, which is in the form of a disk, is fastened to the first shaft 32 by screws 34 and disposed in the first opening 14a. The second valve body 12b, which is in the form of a disk, is fastened to the first shaft 32 by screws 36 and disposed in the second opening 14b. As shown in FIGS. 3 and 4, the first valve body 12a and the second valve body 12b are coupled to the first shaft 32 and lie substantially perpendicularly to each other.

To the valve housing 16, there is attached a pipe 40 connecting a first port 38a at the inlet of the first opening 14a and a third port 38c at the inlet of the second opening 14b to the heat radiator 220 of the fuel cell system 200 (see FIG. 1). A second port (first reaction gas outlet) 38b at the outlet of the first opening 14a and a fourth port (second reaction gas outlet) 38d at the outlet of the second opening 14b are connected to the air supply port 206 of the cathode 203 through a pipe (not shown).

When the air is introduced through the pipe 40 into the valve device 10, the air is divided into flows in the first port 38a and the third port 38c, which serve as reaction gas inlets, and introduced into the first opening 14a and the second opening 14b.

In FIG. 3, the first port 38a and the second port 38b are shown as communicating with each other through the first valve body 12a, and the third port 38c and the fourth port 38d are shown as being kept out of communication with each other by the second valve body 12b. Therefore, the air introduced into the first opening 14a flows through the first opening 14a and is supplied from the second port 38b to the cathode humidifier 222, and the air introduced into the second opening 14b does not flow through the third port 38c.

In FIG. 3, the first valve body 12a and the second valve body 12b are angularly positioned when no electric current is supplied to the stepping motor 24 (see FIG. 2), and hence the stepping motor 24 remains de-energized. Specifically, the second valve body 12b is a normally closed valve body which closes the second opening 14b to prevent the air from flowing into the bypass passage 219b (see FIG. 1), and the first valve body 12a is a normally open valve body which opens the first opening 14a to allow the air to flow from the heat radiator 220 through the main passage 219a into the cathode humidifier 222, when no electric current is supplied to the stepping motor 24.

The rate of the air flowing through the bypass passage 219b is smaller than the rate of the air flowing through the main passage 219a. Therefore, the inside diameter (opening diameter) of the second opening 14b that provides the bypass passage 219b may be smaller than the inside diameter (opening diameter) of the first opening 14a that provides the main passage 219a. The diameter of the second valve body 12b which opens or closes the second opening 14b may thus be smaller than the diameter of the first valve body 12a which opens or closes the first opening 14a.

The first shaft 32, the first valve body 12a, the second valve body 12b, and the screws 34, 36 should preferably be made of stainless steel to prevent themselves from being corroded by moisture contained in the air flowing through the first opening 14a and the second opening 14b.

The lower end portion of the first shaft 32 which extends through the guide hole 30c is rotatably supported by a bearing 42 disposed in a hole 41 that is defined in the valve housing 16 in communication with the guide hole 30c. The guide hole 30c and the hole 41 communicate with each other through a hole 44 which houses therein an annular seal 48 that holds the bearing 42 in the axial direction of the first shaft 32 and surrounds the outer circumferential surface of the first shaft 32 adjacent to a collar 46 mounted in the hole 41. The annular seal 48 has a first lip 50a inclined toward the first opening 14a and a second lip 50b inclined toward the bearing 42. The first lip 50a and the second lip 50b serve to prevent air from leaking out from the first opening 14a, to prevent moisture contained in the air from leaking out from the first opening 14a, and also to prevent dust particles and other foreign matter from entering from outside of the valve housing 16 into the first opening 14a.

The valve housing 16 includes a hollow cylindrical sleeve 56 disposed substantially centrally in the chamber 18 near the second opening 14b coaxially with the first shaft 32. The sleeve 56 houses therein a bearing 58 by which the first shaft 32 is rotatably supported. Two annular collars 60a, 60b are disposed adjacent to the bearing 58 in the sleeve 56. The sleeve 56 also houses therein an annular seal 62 that holds the bearing 58 in the axial direction of the first shaft 32 and surrounds the outer circumferential surface of the first shaft 32 adjacent to the collar 60b. The annular seal 62 has a first lip 64a inclined toward the closure member 20 and a second lip 64b inclined toward the second opening 14b.

The first lip 64a and the second lip 64b serve to prevent air from leaking from the second opening 14b into the chamber 18, to prevent moisture contained in the air from leaking into the chamber 18, and also to prevent dust particles and other foreign matter from entering from the chamber 18 into the second opening 14b.

The first shaft 32 has an externally threaded upper end portion 66 (see FIG. 4) coupled to a driven plate (first angular movement transmitting member) 72 by a nut 70 with a washer 68 interposed therebetween in the chamber 18, the driven plate 72 having an essentially disk-shaped base. A torsion spring (second resilient member) 74 is disposed around the sleeve 56 in the chamber 18 axially between the driven plate 72 and the valve housing 16. The torsion spring 74 normally biases the first shaft 32 to turn about its own axis to close or open the first valve body 12a and the second valve body 12b.

The torsion spring 74 has an end engaging the bottom of a stepped recess 75 defined in the valve housing 16 outwardly of the sleeve 56, and an opposite end engaging in a recess 77 (see FIGS. 4 and 5) defined in the driven plate 72. The valve housing 16 and the driven plate 72 are thus operatively connected to each other by the torsion spring 74. The torsion spring 74 exerts spring forces in a direction to urge the first valve body 12a to be fully closed with respect to the driven plate 72, and to urge the second valve body 12b to be fully opened with respect to the driven plate 72.

Figure 5:
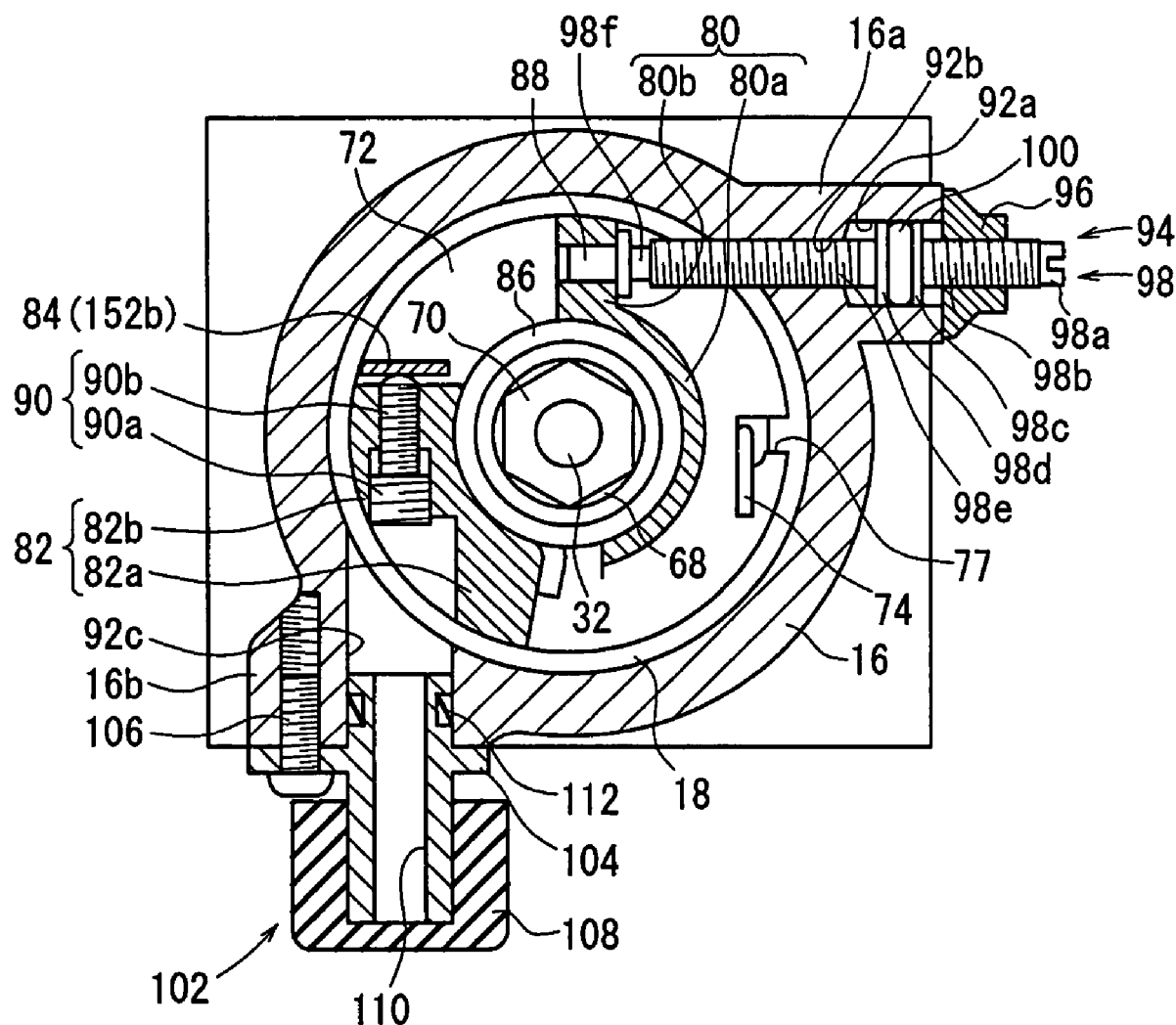
FIG. 5 is a cross-sectional view taken along line V-V of FIG. 2.

As shown in FIGS. 3 through 5, the driven plate 72 having a substantially disk-shaped base is fastened to the first shaft 32 by the nut 70 that is threaded over the externally threaded upper end portion 66 of the first shaft 32 which extends substantially centrally through the driven plate 72.

An annular guide 76 is disposed on the lower surface of the driven plate 72 and projects by a predetermined distance therefrom toward the second opening 14b. The annular guide 76 engages in a circular step 78 defined to a predetermined depth in the outer circumferential surface of the sleeve 56. The driven plate 72 is angularly movable around the first shaft 32 while being guided by the annular guide 76.

A first block 80 and a second block 82 are disposed on the upper surface of the driven plate 72 and project upwardly toward the closure member 20, as shown in FIGS. 3 through 5. The first block 80 has a first portion 80a of an arcuate shape surrounding a torsion spring (first resilient member)

86 that is interposed between the driven plate 72 and a drive plate (second angular movement transmitting member) 84 (see FIGS. 3 through 6), to be described later, and a second portion 80b projecting from an end of the first portion 80a in the radially outward direction of the driven plate 72. A pin 88 (see FIG. 5) is fitted in a hole defined in the second portion 80b.

The second block 82 has a first portion 82a surrounding the torsion spring 86 and engaging a lower end of the torsion spring 86, the first portion 82a projecting in the radially outward direction of the driven plate 72, and a second portion 82b projecting in the radially outward direction of the driven plate 72 and engaging the drive plate 84 through a screw assembly (engaging mechanism) 90. The screw assembly 90 is threaded in a hole defined in the second portion 82b. The screw assembly 90 comprises an engaging screw 90a threaded into the second portion 82b using a tool such as a hexagonal wrench (not shown) and an abutment screw 90b threaded into the engaging screw 90a and the second portion 82b for abutment against the drive plate 84 upon angular movement in unison with the engaging screw 90a.

The first block 80 and the second block 82 are positioned substantially in a point symmetry with respect to the center of the driven plate 72, i.e., the axis of the first shaft 32. The second portion 80b of the first block 80 and the second portion 82b of the second block 82 are angularly spaced about 90° apart from each other on the upper surface of the driven plate 72.

The valve housing 16 has a boss 16a (see FIG. 5) projecting outwardly and having a first hole 92a and a second hole 92b that are defined coaxially therein in communication with the chamber 18. A zero-point adjustment mechanism (angular movement start position limiting mechanism) 94 extends through the first hole 92a and the second hole 92b.

As shown in FIGS. 4 and 5, the zero-point adjustment mechanism 94 comprises a nut 96, a screw assembly 98, and an O-ring 100. The screw assembly 98 comprises an adjuster 98a engageable with a tool, e.g., a slotted screwdriver, (not shown), a first screw 98b threaded in the nut 96, a first flange 98c and a second flange 98d securely holding the O-ring 100 thereon around the screw assembly 98 in the first hole 92a, a second screw 98e fixed coaxially to the first screw 98b with the first and the second flanges 98c, 98d interposed therebetween and threaded in the second hole 92b, and an engaging tip 98f mounted on the end of the second screw 98e remotely from the adjuster 98a for engagement with the pin 88 upon turning of the slotted screwdriver in engagement with the adjuster 98a.

The O-ring 100 is held against the inner circumferential wall surface of the first hole 92a by the first flange 98c and the second flange 98d, thereby hermetically sealing the chamber 18 for protection against entry of dust particles and other foreign matter from outside of the valve housing 16 through the holes 92a, 92b into the chamber 18.

When the slotted screwdriver whose tip end is held in engagement with the adjuster 98a is turned about its own axis, the screw assembly 98 is axially displaced toward the pin 88 until the tip end of the engaging tip 98f is brought into abutment against the tip end of the pin 88. Continued axial displacement of the screw assembly 98 turns the first block 80 (the driven plate 72) to which the pin 88 is fixed, counterclockwise about the center of the driven plate 72 as shown in FIG. 5. The first shaft 32 that is coupled to the driven plate 72 is turned to turn the first valve body 12a and the second valve body 12b (see FIGS. 2 through 4). Therefore, the zero-point adjustment mechanism 94 is capable of adjusting the initial position (angular movement start position) of the first valve body 12a and the second valve body 12b when the stepping motor 24 is de-energized.

As shown in FIGS. 2 and 5, the valve housing 16 also has another boss 16b projecting outwardly and having a third hole (adjustment hole) 92c communicating with the chamber 18. The third hole 92c is closed by a seal mechanism 102.

As shown in FIGS. 2, 3, and 5, the seal mechanism 102 comprises a joint 104 connected to the boss 16b, a screw 106, and a seal cap 108. The screw 106 is threaded through the joint 104 into the boss 16b to fasten the joint 104 to the boss 16b. The seal cap 108 is fitted over the joint 104 to close a hole 110 that is defined in the joint 104 in communication with the third hole 92c.

The seal cap 108 comprises a rubber cap for allowing the chamber 18 to communicate with the exterior space of the valve housing 16 when the seal cap 108 is removed, and also for preventing a fluid such as water from entering the chamber 18 when the seal cap 108 is put on the joint 104. The joint 104 has an annular groove defined in an outer circumferential surface thereof near its inner end and housing an O-ring 112 therein. The O-ring 112 keeps the chamber 18 hermetically sealed, and prevents dust particles and foreign matter from entering from outside of the valve housing 16 through the joint 104 into the chamber 18.

With the seal cap 108 removed from the joint 104, the hexagonal wrench is inserted through the hole 110 and the third hole 92c into engagement with the engaging screw 90a. The hexagonal wrench is turned to turn the engaging screw 90a out of the second portion 82b. Then, an adjustment screwdriver or the like is used to turn the abutment screw 90b to move axially toward the drive plate 84. The tip end of the abutment screw 90b engages the drive plate 84 and turns the drive plate 84 clockwise in FIG. 5. The engagement between the drive plate 84 and the driven plate 72 can be adjusted by the abutment screw 90b.

As shown in FIGS. 2 and 3, the closure member 20, which is of a rectangular shape, is fastened to the valve housing 16 by a screw 120, thereby closing the chamber 18. A first mounting plate 121 and a second mounting plate 124, which covers the first mounting plate 121 and has spacers 122, are fastened to the closure member 20 by screws 126 that extend through the spacers 122. The opening sensor 22 is fixed to the second mounting plate 124 by a screw 128, and the stepping motor 24 is fixed to the second mounting plate 124 by screws (not shown).

The stepping motor 24 has a drive shaft (not shown) operatively coupled to a second shaft 132 by a gear 130 connected to the drive shaft. The second shaft 132 has an upper end portion extending into the opening sensor 22 and a lower end portion rotatably supported in the closure member 20 by a bearing 136 that is disposed in a hole 134 defined substantially centrally in the closure member 20. The lower end portion of the second shaft 132 extends downwardly into the chamber 18 in the valve housing 16. The second shaft 132 is held coaxially with the first shaft 32, and is surrounded by collars 138, 140 disposed in the hole 134 adjacent to the bearing 136.

The lower end portion of the second shaft 132 has an externally threaded lower end 142 (see FIG. 4). The drive plate 84, which is substantially in the form of a disk, and a circular guide 148 are coupled to the externally threaded lower end 142 by a nut 146 threaded thereover with a washer 144 interposed therebetween. The torsion spring 86 is disposed around the circular guide 148 and extends axially between the driven plate 72 and the drive plate 84.

Figure 6:
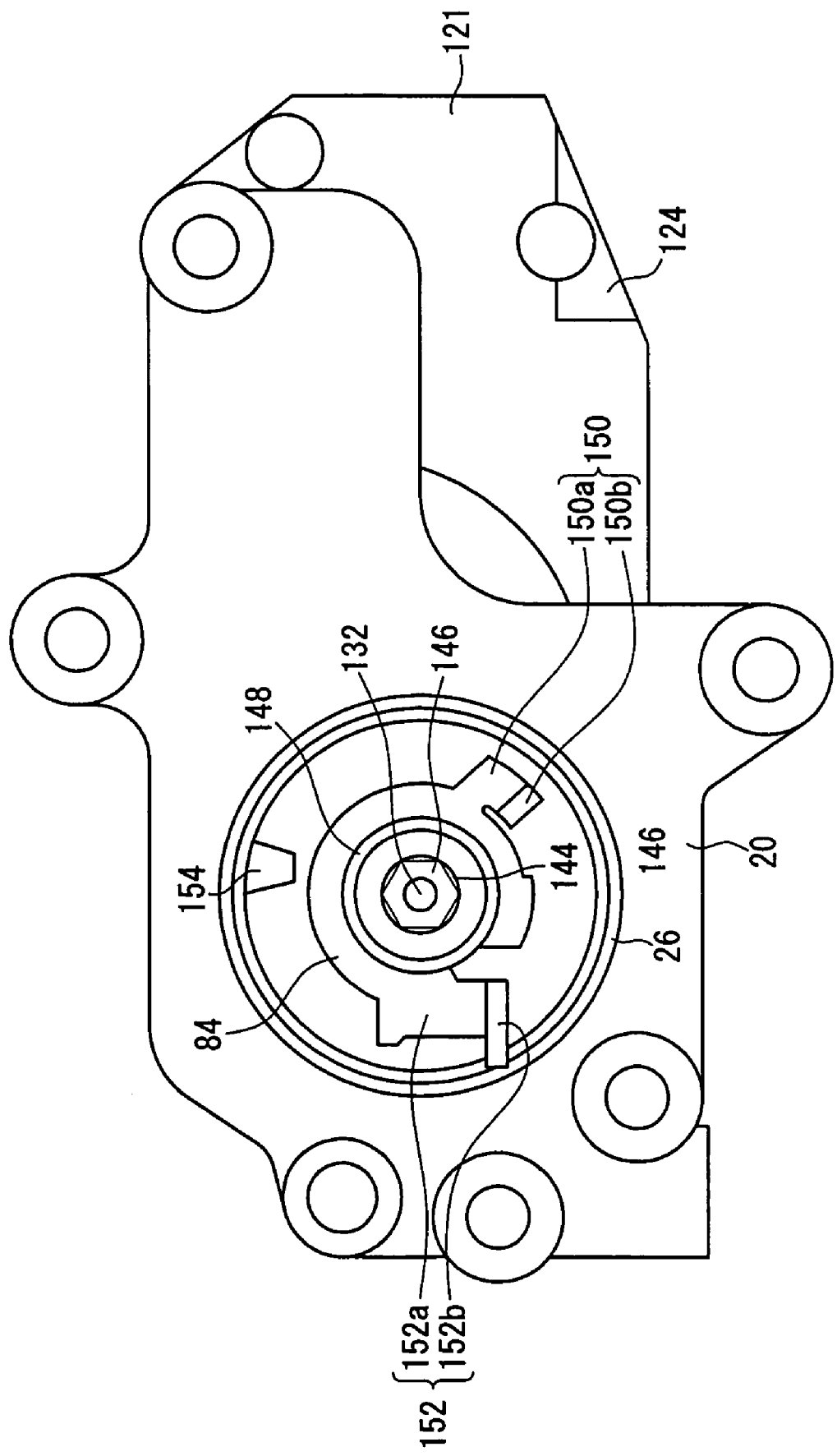
FIG. 6 is a bottom view of a closure member detached from a valve housing shown in FIG. 2.

As shown in FIGS. 3, 4, and 6, the nut 146 is threaded over the externally threaded lower end 142 of the second shaft 132 that extends substantially centrally through the drive plate 84.

The drive plate 84 has a first engaging arm 150 and a second engaging arm 152 which are angularly spaced a certain angle from each other around the outer circumferential surface of the drive plate 84. The first engaging arm 150 and the second engaging arm 152 project downwardly toward the driven plate 72. The first engaging arm 150 has a finger 150a extending radially outwardly from the outer circumferential surface of the drive plate 84 and a protrusion 150b projecting downwardly from the distal end of the finger 150a toward the driven plate 72. The protrusion 150b engages an upper end of the torsion spring 86. The second engaging arm 152 has a finger 152a extending radially outwardly from the outer circumferential surface of the drive plate 84 and a protrusion 152b projecting downwardly from the distal end of the finger 152a toward the driven plate 72. The protrusion 152b abuts the tip end of the abutment screw 90b of the screw assembly 90.

The annular ridge 26 has a tooth (angular movement end position setting member) 154 projecting radially inwardly toward the center of the drive plate 84. When the second shaft 132 and the drive plate 84 are turned in unison with each other clockwise in FIG. 6 by the stepping motor 24 (see FIG. 2), the finger 152a of the second engaging arm 152 is also turned until it abuts against the tooth 154. When the finger 152a engages the tooth 154, the drive plate 84 and the second shaft 132 stop against further angular movement. Therefore, the position where the finger 152a engages the tooth 154 is a position where the second shaft 132 and the drive plate 84 stop against further angular movement.

The upper end portion of the second shaft 132 extends into the opening sensor 22 which serves to detect the opening of the first valve body 12a with respect to the first opening 14a and the opening of the second valve body 12b with respect to the second opening 14b. The opening sensor 22 may comprise a Hall device for detecting the magnetic field of a magnet embedded in the upper end portion of the second shaft 132 to detect the angular position of the second shaft 132.

The valve device 10 for use with fuel cells according to the embodiment of the present invention is basically constructed as described above. Operation of the valve device 10 will be described in detail below.

If the temperature of the air supplied to the fuel cell system 200 (see FIG. 1) is low or the fuel cell system 200 has not reached a necessary temperature and the air is not to be humidified by the cathode humidifier 222, but is to be supplied through the bypass passage 219b to the cathode 203, then the stepping motor 24 is energized to angularly displace the first valve body 12a from an open position in the first opening 14a as shown in FIGS. 2 and 3 into a closed position and to angularly displace the second valve body 12b from a closed position in the second opening 14b as shown in FIGS. 2 and 3 into an open position.

Specifically, the tip end of the non-illustrated slotted screwdriver is brought into engagement with the adjuster 98a (see FIG. 5), and is turned to turn the adjuster 98a in a direction to move the screw assembly 98 toward the pin 88. The screw assembly 98 moves toward the pin 88 until the tip end of the engaging tip 98f engages the tip end of the pin 88, whereupon the first block 80 to which the pin 88 is fixed is turned counterclockwise in FIG. 5. At this time, the first valve body 12a and the second valve body 12b (see FIGS. 1 through 3) are also turned in the same direction by the first shaft 32 that is coupled to the driven plate 72. The adjuster 98a is turned by the slotted screwdriver to an angular movement start position where the second valve body 12b is slightly open.

Then, the seal cap 108 (see FIGS. 2, 3, and 5) is removed from the joint 104, and the tip end of the non-illustrated hexagonal wrench is inserted into the tip end of the engaging screw 90a through the hole 110 and the third hole 92c. The hexagonal wrench is turned to remove the engaging screw 90a. Then, the abutment screw 90b is turned by an adjustment screwdriver or the like until the tip end of the abutment screw 90b engages the protrusion 152b of the second engaging arm 152, turning the drive plate 84 clockwise in FIG. 5. The driven plate 72 is now held in engagement with the drive plate 84 through the screw assembly 90.

The seal cap 108 is mounted on the joint 104, after which the stepping motor 24 (see FIG. 24) is energized by a power supply (not shown) to cause the drive shaft thereof to start rotating, turning the second shaft 132 through the gear 130 (see FIG. 3). The opening sensor 22 detects a change in the angular position of the second shaft 132.

The drive plate 84 coupled to the second shaft 132 is also turned in unison therewith clockwise in FIG. 6. As the drive plate 84 is turned, the driven plate 72 which engages the second engaging arm 152 of the drive plate 84 through the screw assembly 90 (see FIGS. 4 and 5) is turned in unison with the drive plate 84 counterclockwise in FIG. 5 against the bias of the torsion spring 86.

The first shaft 32 (see FIGS. 3 and 4) coupled to the driven plate 72 is also turned in unison with the driven plate 72, angularly moving the first valve body 12a from the open position to the closed position and also angularly moving the second valve body 12b from the closed position to the open position. Since the torsion spring 74 coupled to the driven plate 72 applies its spring forces in a direction to assist in turning the driven plate 72, the first valve body 12a is quickly turned from the open position to the closed position and the second valve body 12b is quickly turned from the closed position to the open position.

Then, the first shaft 32 is further turned to turn the first valve body 12a and the second valve body 12b from their respective angular movement start positions. When the first valve body 12a is angularly displaced into the closed position and the second valve body 12b is angularly displaced into the open position, the finger 152a of the second engaging arm 152 of the drive plate 84 engages the tooth 154 (see FIG. 6) of the closure member 20.

The drive plate 84 and the second shaft 132 stop against further angular movement, and the driven plate 72 (see FIGS. 3 through 5) which engages the drive plate 84 through the screw assembly 90 and the first shaft 32 coupled to the driven plate 72 also stop against further angular movement. In the position where the finger 152a and the tooth 154 engage each other, the first valve body 12a is kept in the closed position and the second valve body 12b is kept in the open position. Therefore, the first valve body 12a and the second valve body 12b are angularly moved in a range from the angular movement start position to the angular movement end position.

The third port 38c (see FIG. 3) and the fourth port 38d of the second opening 14b are held in fluid communication with each other, bringing the heat radiator 220 and the cathode 203 shown in FIG. 1 into fluid communication with each other through the bypass passage 219b. The air that is supplied to the oxidizing agent supply 204 shown in FIG. 1 is supplied through the heat radiator 220 and the bypass passage 219b to the cathode 203 from the air supply port 206 of the fuel cell stack 202.

The hydrogen supplied from the fuel supply 212 is supplied through the pressure controller 224, the ejector 226, and the anode humidifier 228 to the anode 201 from the hydrogen supply port 214 of the fuel cell stack 202. The fuel cell stack 202 now generates electric power.

If the supplied air is of a desired temperature, then the air supplied from the oxidizing agent supply 204 needs to be supplied through the main passage 219a directly to the cathode humidifier 222, and the bypass passage 219b needs to be closed.

Specifically, the stepping motor 24 is de-energized to stop rotating the drive shaft thereof and hence the second shaft 132 and the drive plate 84. The drive plate 84 and the second shaft 132 are turned counterclockwise in FIG. 6 under the bias of the torsion spring 86, whereupon the driven plate 72 and the first shaft 32 coupled to the driven plate 72 are turned together clockwise in FIG. 5 by the screw assembly 90. As a result, the first valve body 12a and the second valve body 12b which are coupled to the first shaft 32 are turned, so that the first valve body 12a is angularly displaced from the closed position to the open position shown in FIGS. 2 and 3 and the second valve body 12b is angularly displaced from the open position to the closed position shown in FIGS. 2 and 3. The third port 38c and the fourth port 38d are now put out of fluid communication with each other.

With the valve device 10 for use with fuel cells according to the embodiment of the present invention, the first valve body 12a is disposed in the main passage 219a upstream of the cathode humidifier 222, and the second valve body 12b is disposed in the bypass passage 219b which bypasses the cathode humidifier 222. When the first valve body 12a opens the first opening 14a which provides the main passage 219a, the second valve body 12b closes the second opening 14b which provides the bypass passage 219b. Conversely, when the first valve body 12a closes the first opening 14a, the second valve body 12b opens the second opening 14b.

In this manner, the main passage 219a and the bypass passage 219b, which serve as reaction gas passages, can reliably be selected one at a time. When the reaction gas flows through the bypass passage 219b, a portion of the reaction gas is prevented from being introduced into the cathode humidifier 222. Consequently, the cathode 203 is prevented from being supplied with a humidified reaction gas, and the power generating efficiency of the fuel cell system 200 is prevented from being lowered.

Since the rate of the reaction gas flowing through the bypass passage 219b is smaller than the rate of the reaction gas flowing through the main passage 219a, the opening diameter of the second opening 14b may be smaller than opening diameter of the first opening 14a, and the diameter of the second valve body 12b may be smaller than the diameter of the first valve body 12a. In this manner, the valve device 10 may be reduced in size.

The valve housing 16 has the first opening 14a and the second opening 14b, and the first valve body 12a is disposed in the first opening 14a and the second valve body 12b in the second opening 14b. The space in which the first valve body 12a and the second valve body 12b are disposed in the valve device 10 is reduced, making it possible to reduce the overall size of the valve device 10. As the first opening 14a and the second opening 14b are provided as branched passages respectively in the first port 38a and the third port 38c, which serve as reaction gas inlets, the pipe 40 and flow passages can easily be connected between the heat radiator 220 and the first and third ports 38a, 38c when the valve device 10 is applied to the fuel cell system 200.

When the first shaft 32 is turned, the first valve body 12a and the second valve body 12b are simultaneously turned to open and close the first opening 14a and the second opening 14b. Inasmuch as the first opening 14a and the second opening 14b can be opened and closed by a single actuating mechanism, the valve device 10 may be further reduced in size, and the first opening 14a and the second opening 14b can be designed in an improved layout.

The second valve body 12b is coupled to the first shaft 32 at a position closer to the stepping motor 24 than the first valve body 12a. Consequently, the second opening 14b can be opened and closed highly accurately by the second valve body 12b for reliably allowing the reaction gas to bypass the cathode humidifier 222. Stated otherwise, when the second valve body 12b closes the second opening 14b, the first valve body 12a opens the first opening 14a to reliably pass the reaction gas introduced into the first opening 14a to the cathode humidifier 222.

The engaging tip 98f of the zero-point adjustment mechanism 94 is held against the pin 88 fixed to the driven plate 72 for causing the first valve body 12a to close the first opening 14a or causing the second valve body 12b to close the second opening 14b at the angular movement start position. Therefore, the action of the first valve body 12a to open and close the first opening 14a and the action of the second valve body 12b to open and close the second opening 14b can be adjusted highly accurately.

When the stepping motor 24 is energized, the first shaft 32, the driven plate 72, the drive plate 84, and the second shaft 132 are angularly moved in the range from the angular movement start position to the angular movement end position that is set by the tooth 154. Therefore, if the angular movement start position is set to a position where the first valve body 12a opens the first opening 14a and the second valve body 12b closes the second opening 14b and the angular movement end position is set to a position where the first valve body 12a closes the first opening 14a and the second valve body 12b opens the second opening 14b, then the action of the first valve body 12a to open and close the first opening 14a and the action of the second valve body 12b to open and close the second opening 14b can be adjusted more highly accurately.

The angular movement start position may be set to a position where the first valve body 12a closes the first opening 14a and the second valve body 12b opens the second opening 14b and the angular movement end position may be set to a position where the first valve body 12a opens the first opening 14a and the second valve body 12b closes the second opening 14b.

The second engaging arm 152 projects from the drive plate 84, and the screw assembly 90 is mounted in the second block 82 of the driven plate 72 in engagement with the drive plate 84 for turning the drive plate 84. Therefore, when the second shaft 132 and the drive plate 84 are turned by the stepping motor 24, the driven plate 72 is smoothly turned by the drive plate 84 through the second engaging arm 152 and the screw assembly 90.

The position in which the screw assembly 90 engages the second engaging arm 152 can be changed by operating the screw assembly 90 from outside through the third hole 92c and the hole 110 in the joint 104. Therefore, even after the chamber 18 in the valve housing 16 is closed by the closure member 20 with the drive plate 84 housed in the valve housing 16, the position in which the screw assembly 90 engages the second engaging arm 152 can be adjusted.

Accordingly, the stepping motor 24, the second shaft 132, and the drive plate 84 can easily be installed on the valve housing 16.

As the third hole 92c is closed by the seal mechanism 102, the chamber 18 is allowed to communicate with the exterior when the seal cap 108 is removed, and a fluid such as water is prevented from entering the chamber 18 when the seal cap 108 is put on the joint 104.

The torsion springs 74, 86 disposed in the valve housing 16 are capable of preventing vibrations from occurring radially of the second shaft 132 due to backlash of the gear 130 when the second shaft 132 is turned. The torsion springs 74, 86 thus allow the first valve body 12a and the second valve body 12b to be turned highly accurately.

The first valve body 12a is a normally open valve body and the second valve body 12b is a normally closed valve body. Therefore, when the stepping motor 24 is turned off, the second valve body 12b closes the second opening 14b, and the first valve body 12a opens the first opening 14a. The reaction gas from the heat radiator 220 is introduced from the main passage 219a into the cathode humidifier 222, which supplies the humidified reaction gas to the cathode 203. Even when the stepping motor 24 is turned off, since the bypass passage 219b is quickly closed, the reaction gas is reliably prevented from flowing through the bypass passage 219b into the cathode 203, and hence is reliably humidified by the cathode humidifier 222.

In the illustrated embodiment, the rotational power of the drive shaft of the stepping motor 24 is transmitted through the gear 130 to the second shaft 132. However, the second shaft 132 may be employed as the drive shaft of the stepping motor 24 to apply the rotational power of the drive shaft directly to turn the drive plate 84.

Although a certain preferred embodiment of the present invention has been shown and described in detail, it should be understood that various changes and modifications may be made therein without departing from the scope of the appended claims.

What is claimed is:

1. A valve device for bypassing a humidifier disposed in a reaction gas passage of a fuel cell system to supply a reaction gas from a heat radiator to the cathodes of fuel cells, comprising:
    a first opening for providing fluid communication between said heat radiator and said humidifier to pass said reaction gas therethrough;
    a second opening for providing fluid communication between said heat radiator and said cathodes to pass said reaction gas therethrough;
    a first valve body for selectively opening and closing said first opening;
    a second valve body for selectively opening and closing said second opening;
    an opening sensor for detecting an opening of said first valve body with respect to said first opening and an opening of said second valve body with respect to said second opening;
    a valve housing, said first valve body being disposed in said first opening, said first opening being defined in said valve housing, said second valve body being disposed in said second opening, said second opening being defined in said valve housing;
    a first shaft extending coaxially diametrically with said first valve body and said second valve body, and angularly movably interconnecting said first valve body and said second valve body;
    a motor for angularly moving said first shaft about its own axis;
    a first angular movement transmitting member engaging said first shaft for angularly moving said first shaft when said motor is energized, said first angular movement transmitting member being disposed in said valve housing;
    an angular movement start position limiting mechanism for being held against said first angular movement transmitting member for limiting an angular movement start position of said first angular movement transmitting member, said angular movement start position limiting mechanism being disposed in said valve housing;
    a closure member closing said valve housing, said motor being mounted on said valve housing by said closure member;
    a second shaft mounted on said closure member and angularly movable about its own axis when said motor is energized;
    a second angular movement transmitting member interposed between said second shaft and said first angular movement transmitting member, for transmitting angular movement of said second shaft to said first angular movement transmitting member; and
    an angular movement end position setting member for being held against said second angular movement transmitting member for limiting an angular movement end position of said second angular movement transmitting member;
    wherein when said first valve body opens said first opening, said second valve body closes said second opening, and when said first valve body closes said first opening, said second valve body opens said second opening;
    said first opening and said second opening have ends serving as reaction gas inlets for introducing said reaction gas;
    said first opening has another end serving as a first reaction gas outlet for discharging said reaction gas when said first valve body opens said first opening; and
    said second opening has another end serving as a second reaction gas outlet for discharging said reaction gas when said second valve body opens said second opening;
    said second valve body is coupled to said first shaft at a position closer to said motor than said first valve body.

2. A valve device according to claim 1, wherein said second opening has an opening diameter smaller than an opening diameter of said first opening, and said second valve body has a diameter smaller than a diameter of said first valve body.

3. A valve device according to claim 1, wherein said second angular movement transmitting member has an engaging arm projecting toward said first angular movement transmitting member, and said first angular movement transmitting member has an engaging mechanism for engaging said engaging arm.

4. A valve device according to claim 3, wherein said engaging mechanism and said engaging arm engage each other at a position which can be changed by operating said engaging mechanism from outside of said valve housing through an adjustment hole defined in said valve housing.

5. A valve device according to claim 4, further comprising a seal mechanism closing said adjustment hole for allowing an interior space in said valve housing to communicate with an exterior space around said valve housing, and preventing a fluid from flowing into the interior space in said valve housing.

6. A valve device according to claim 1, wherein said motor comprises a stepping motor for angularly moving said second shaft about its own axis through a gear, further comprising:
   a first resilient member disposed in said valve housing and having an end engaging said first angular movement transmitting member and an opposite end engaging said second angular movement transmitting member; and
   a second resilient member disposed in said valve housing and engaging said first angular movement transmitting member, for urging said first shaft to angularly move about its own axis when said first angular movement transmitting member is angularly moved.

7. A valve device according to claim 6, wherein said valve housing has a chamber defined thereby and closed by said closure member,
   said first angular movement transmitting member, said second angular movement transmitting member, said first resilient member, said second resilient member, said engaging mechanism, and said angular movement end position setting member are disposed in said chamber, and
   said first shaft, said second shaft, and said angular movement start position limiting mechanism are partly inserted in said chamber.

8. A valve device according to claim 7, wherein said valve housing has a first guide hole defined therein substantially perpendicularly to said first opening and said second opening and providing fluid communication between said chamber and said second opening, a second guide hole defined therein and providing fluid communication between said first opening and said second opening, and a third guide hole defined therein and providing fluid communication between said first opening and an exterior space around said valve housing, said first guide hole, said second guide hole, and said third guide hole being disposed coaxially with each other, said first shaft extending through said first guide hole, said second guide hole, said third guide hole, said first opening, and said second opening.

9. A valve device according to claim 8, wherein said first resilient member has an end engaging a block disposed on said first angular movement transmitting member and projecting toward said closure member, and an opposite end engaging an engaging arm disposed on said second angular movement transmitting member, and
   said second resilient member has an end engaging a bottom of said chamber which is close to said first opening and said second opening and an opposite end engaging in a recess defined in said first angular movement transmitting member.

10. A valve device according to claim 8, further comprising seals mounted respectively in said first guide hole and said third guide hole in surrounding relation to an outer circumferential surface of said first shaft.

11. A valve device according to claim 1, wherein said first valve body comprises a normally open valve body for opening said first opening when said motor is de-energized, and said second valve body comprises a normally closed valve body for closing said second opening when said motor is de-energized.

12. A valve device according to claim 1, wherein said opening sensor detects an angular position of said second shaft which is angularly moved by said motor, said second shaft having an end portion extending into said opening sensor.

13. A valve device according to claim 1, wherein said first valve body is coupled to said first shaft by a screw, and said second valve body is coupled to said first shaft by a screw.

14. A valve device according to claim 13, wherein said first valve body, said second valve body, said first shaft, and said screws are made of stainless steel.

\* \* \* \* \*